(12) United States Patent
Villaume et al.

(10) Patent No.: US 8,355,831 B2
(45) Date of Patent: Jan. 15, 2013

(54) METHOD AND DEVICE FOR ASSISTING IN THE PILOTING OF AN AIRCRAFT DURING A LANDING

(75) Inventors: Fabrice Villaume, Seysses (FR); Jérôme Journade, Tournefeuille (FR); Robert Lignee, Tournefeuille (FR)

(73) Assignee: Airbus Operations (SAS), Toulouse Cedex (FR)

( * ) Notice: Subject to any disclaimer, the term of this patent is extended or adjusted under 35 U.S.C. 154(b) by 232 days.

(21) Appl. No.: 12/693,277

(22) Filed: Jan. 25, 2010

(65) Prior Publication Data

US 2010/0191394 A1 Jul. 29, 2010

(30) Foreign Application Priority Data

Jan. 29, 2009 (FR) ...................................... 09 00376

(51) Int. Cl.
*G06F 19/00* (2011.01)
*B64C 25/42* (2006.01)

(52) U.S. Cl. ............................. 701/16; 701/70; 244/111

(58) Field of Classification Search .................. None
See application file for complete search history.

(56) References Cited

U.S. PATENT DOCUMENTS

| | | |
|---|---|---|
| 2005/0006524 A1* | 1/2005 | Villaume et al. .............. 244/111 |
| 2006/0241819 A1 | 10/2006 | Greene |
| 2007/0271019 A1* | 11/2007 | Dellac et al. .................... 701/70 |

FOREIGN PATENT DOCUMENTS

| | | |
|---|---|---|
| EP | 1496413 | 1/2005 |
| FR | 2817979 | 6/2002 |
| FR | 2857468 | 1/2005 |
| WO | WO 02/47977 | 6/2002 |

* cited by examiner

*Primary Examiner* — Ryan Zeender
*Assistant Examiner* — Denisse Ortiz Roman
(74) *Attorney, Agent, or Firm* — Novak Druce + Quigg LLP

(57) ABSTRACT

Method and device for assisting in the piloting of an aircraft during a landing.
The device (1) contains means (10, 11) for calculating turnaround times depending on the use of thrust reversers upon landing, as well as means (11) to display these turnaround times.

11 Claims, 2 Drawing Sheets

METHOD AND DEVICE FOR ASSISTING IN THE PILOTING OF AN AIRCRAFT DURING A LANDING

CROSS-REFERENCE TO RELATED APPLICATIONS

This application claims priority to French Patent Application 0900376, filed Jan. 29, 2009, the entire contents of which are incorporated herein by reference.

FIELD OF THE INVENTION

The invention relates to a method and a device for assisting the piloting of an aircraft, in particular a civil transport plane, during the landing phase.

BACKGROUND OF THE INVENTION

It is known that, in particular, because their aerodynamic configuration is optimised for their cruising speed, aircraft often exhibit a high landing speed which assumes that a significant deceleration (or braking) will be implemented during the rolling of the plane on the landing runway after landing. This braking is effected, in particular, by brakes actuated by brake pedals, acting on the wheels of the main landing gear of the aircraft, as well as by auxiliary devices such as air-brakes or thrust reversers for providing an additional braking in order not to overuse the wheels' brakes and to shorten the landing distance.

It is known that braking on landing, performed by the brakes, causes heating of the wheels and said heating requires a waiting period for the aircraft, before a next flight, so as to allow the wheels to cool down. For the purposes of the invention, the minimum waiting period for the aircraft, required in order to allow the wheels of said aircraft to cool down following heating generated by braking upon landing, before undertaking a further flight, is termed the turnaround time.

The deceleration of an aircraft is ordered either manually and directly by the pilot using, in particular, the brake pedals, or via an automatic braking system which controls a fixed deceleration that is predetermined by the pilot before landing. An automatically-controlled deceleration device for an aircraft in the rolling phase is known through documents FR-2,817,979 and FR-2,857,468.

Furthermore, it is known that thrust reversers, which can be used as auxiliary braking devices, are mounted on the engines of the aircraft. The purpose of such thrust reversers is to direct the thrust, exerted by the engine on which they are installed, ahead in order to slow down the aircraft while rolling along the ground. The normal braking procedure implemented by such thrust reversers consists of extending said reversers once the aircraft is on the ground, then increasing the speed of the engine after the wheels have touched down on the ground, to recreate thrust (the engine being practically at idle upon the landing phase) which will then be directed ahead so as to brake the aircraft.

SUMMARY OF THE INVENTION

The present invention has the object to assist the pilot of the aircraft in his decision-making as regards which braking to implement upon landing. It relates to a method of assisting the piloting of an aircraft upon a landing phase at an airport, said aircraft having engines which are fitted with thrust reversers that are able to be used for braking the aircraft, said thrust reversers being able to be used with the associated engines at maximum speed or at idle speed, said method enabling, in particular, information useful for landing preparation to be provided to the pilot.

Said method is noteworthy in that for this purpose, according to the invention, during the approach to the airport:

a) the predicted values of parameters relating to the aircraft and the airport are determined;

b) through said predicted values, at least the following are calculated:

a first predictive braking power, which represents the braking power of the aircraft relative to a first use of the thrust reversers, preferably at maximum speed, during rolling of the aircraft on the airport landing runway upon landing; and a second predictive braking power, which represents the braking power of the aircraft relative to a second use of the thrust reversers, preferably at idle speed, during rolling of the aircraft on the airport landing runway upon landing;

c) through said first and said second predictive braking powers, the following are, respectively, calculated:

a first turnaround time which is related to said first use of the thrust reversers; and a second turnaround time which is related to said second use of the thrust reversers, a turnaround time representing a predictive waiting period for the aircraft before undertaking a next flight in order to allow the wheels of said aircraft to cool down further to the heating generated by braking on landing; and d) indication means for indicating said first and second turnaround times, are displayed on at least one visualisation screen.

Hence, through the invention, the pilot is informed of the turnaround times required to allow the brakes to cool down after landing, according to the use of the thrust reversers (preferably at maximum speed or at idle speed) upon landing, i.e. according to the amount of auxiliary braking implemented by the thrust reversers. Thus, a decision-making assistance is supplied to the pilot regarding the manner in which the thrust reversers can be used.

In particular, the pilot can verify if said second turnaround time (which is greater than said first turnaround time) is compatible with future journey or journeys, this second time relating preferably to the use of the thrust reversers at idle speed, such a use presenting advantages in comparison to the use of the thrust reversers at maximum speed. Indeed, this use will enable for example to save fuel and consequently to reduce pollutant gas emissions as well as to decrease noise. However, on the other hand, it assumes a longer turnaround time (and more presence on the landing runway). According to the invention, use of thrust reversers can also be envisaged at other speeds than at idle speed and at maximum speed.

The present invention also provides a decision-making assistance relating, if necessary, to the final choice of runway exit that the pilot expects to use, from among the various runway exits available from the runway used for the landing. Indeed, as detailed below, the turnaround times are calculated as a function of a runway exit selected. Consequently, by changing the selection of the runway exit, the pilot can learn, through the present invention, the corresponding turnaround times (i.e. the waiting times). This information enables the pilot to strategically choose the runway exit as a function for instance of the current operational constraints and constraints relating to the next departure.

Advantageously, at step a), the predicted values of the following parameters are determined:

the landing weight of the aircraft;

a temperature difference at the airport;

the altitude of the airport;

the ground speed;
the wind speed;
a level of automatic braking; and
a rolling distance on the landing runway.

Moreover, in a preferred embodiment of the invention, at step b), each of said first and said second predictive braking powers, Emax and Eidle, are determined through a neural network.

Furthermore, advantageously, at step c), said first turnaround time ETATmax and said second turnaround time ETATidle are calculated with the following expressions:

$$\begin{cases} ETAT\max = T0 + K \cdot E\max \\ ETATidle = T0 + K \cdot Eidle \end{cases}$$

in which:
T0 is a predetermined reference time; and
K is a predetermined parameter.

Moreover, in a particular embodiment of the invention, said first and second predictive braking powers, Emax and Eidle, are compared to a usual minimum power E0 requiring a deflation of the tyres, and at step d), said indication means are displayed on said visualisation screen, as a function of said comparisons.

In this particular embodiment, in an advantageous manner:
if Emax<E0 and Eidle<E0, two numerical values are displayed on said visualisation screen, as indication means, indicating respectively said first and second turnaround times, ETATmax and ETATidle;
if Eidle>E0 and Emax>E0, messages are displayed on said visualisation screen, as indication means, which indicates that the data are not valid for said turnaround times ETATmax and ETATidle; and
if Eidle<E0<Emax, a numeric value is displayed on said visualisation screen, as indication means, indicating said turnaround time ETATidle and a message indicating that the data are not valid for said turnaround time ETATmax.

Preferably, the method according to the invention for assisting the piloting, and in particular the display of said first and second turnaround times, is deactivated as soon as a braking mode is armed on the aircraft upon landing.

The present invention also relates to a device for assisting piloting of an aircraft, in particular a civil transport plane, upon the landing phase.

According to the invention, said device is noteworthy in that it comprises:
means for determining the predicted values of parameters linked to the aircraft and the airport;
means for calculating with said predicted values:
  a first predictive braking power, which represents the braking power of the aircraft relative to a use of the thrust reversers at maximum speed, during rolling of the aircraft on the airport landing runway upon landing; and
  a second predictive braking power, which represents the braking power of the aircraft relative to a use of the thrust reversers at idle speed, during rolling of the aircraft on the airport landing runway upon landing;
means for calculating with said first and second predictive braking powers respectively:
  a first turnaround time which relates to a use of the thrust reversers at maximum speed; and
  a second turnaround time which relates to a use of the thrust reversers at idle speed,
  a turnaround time representing a predictive waiting period for the aircraft before undertaking a next flight in order to allow the wheels of said aircraft to cool down further to the heating generated by braking upon landing; and
displaying means to show, on at least one visualisation screen, the indication means for indicating said first and second turnaround times.

Hence, the device of the invention provides the crew of the aircraft with an estimation of the minimum cooling time required for brakes so as to be able to undertake the next flight, and this for two different uses of the thrust reversers as auxiliary braking devices.

The invention also relates to an aircraft, particularly a transport plane, which includes a piloting assistance device such as detailed above.

BRIEF DESCRIPTION OF THE DRAWINGS

The figures in the attached drawings will enable understanding of how the invention can be realised. In these figures, identical references are given to similar elements.

DETAILED DESCRIPTION

Figure 1:
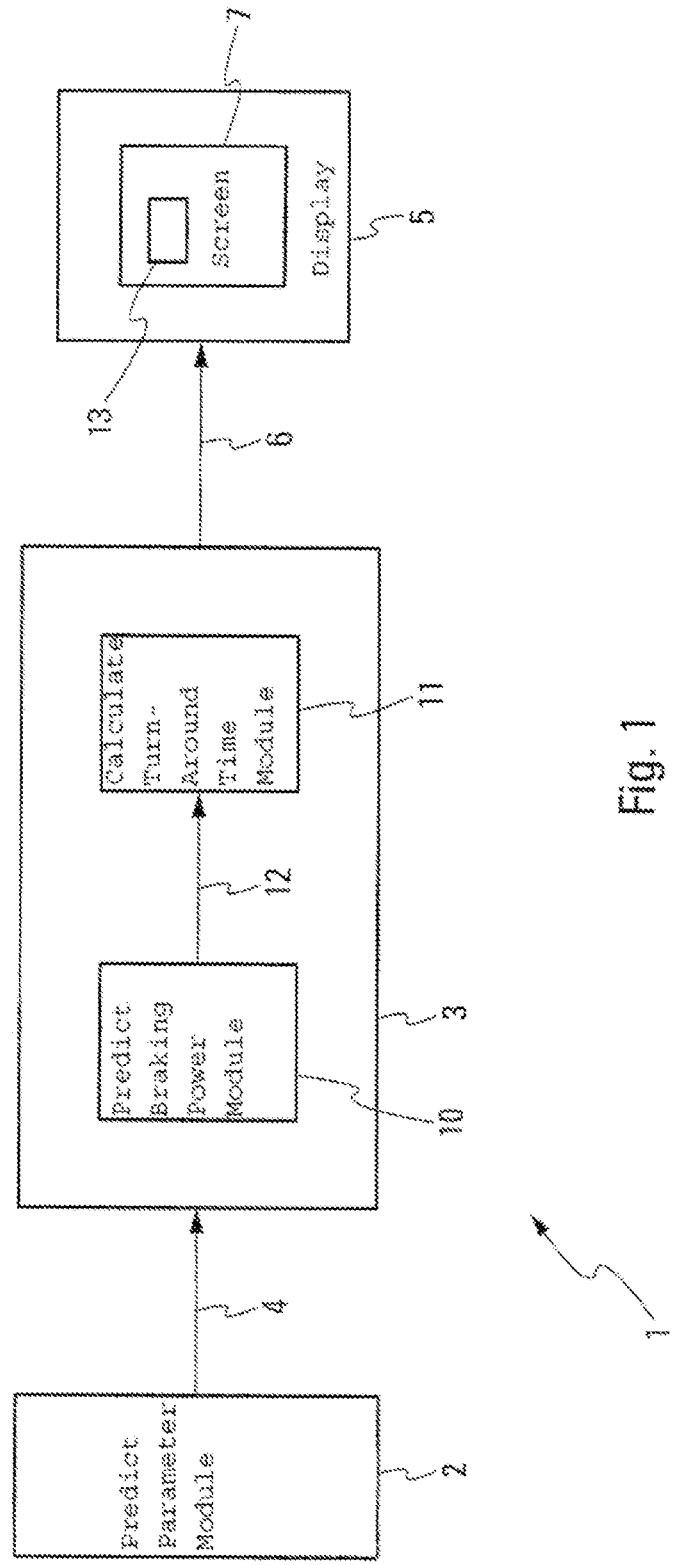
FIG. 1 is a block diagram of a piloting assistance device according to the invention.

The device 1, according to the invention, represented schematically in FIG. 1, is used for providing assistance for piloting an aircraft (not shown), in particular a civil transport plane, upon a landing phase. Said aircraft comprises engines which are each fitted with usual thrust reversers able to be used for braking the aircraft during rolling on the ground on a landing runway upon landing. These thrust reversers are used as auxiliary braking devices, besides for instance the aircraft brakes which perform the main braking thereof by action, in the usual way, on the wheels of the landing gear. These thrust reversers can be utilised at maximum speed or at idle speed of the associated engines.

According to the invention, as shown on FIG. 1, said device 1 comprises:
means 2 to determine predicted values of parameters related to the airport and the aircraft, such as those specified herein below;
a computing unit 3 which is linked via a connection 4 to said means 2 and which is formed so as to determine the turnaround times ETATmax and ETATidle, also specified herein below. For the purposes of the invention, an "Estimated Turn Around Time", or ETAT, is a (predictive) waiting time of the aircraft at the airport after landing to allow the wheels of the landing gear of said aircraft to cool down sufficiently for it to be able to undertake a new flight, further to the heating of these wheels by braking upon landing; and
displaying means 5 which are linked via a connection 6 to said computing unit 3 and which are formed in such a way as to display on at least one visualisation screen 7 indication means 8 and 9 specified herein below, which indicate said turnaround times, ETATmax and ETATidle, determined by said computing unit 3.

For this purpose, said computing unit 3 comprises, according to the invention:
means 10 to calculate, using said predicted values received from means 2:
  a predictive braking power Emax, which represents the braking power of the aircraft relative to a use of the thrust reversers at maximum speed of the associated engines, during rolling of the aircraft on the airport landing runway upon landing; and a predictive braking power Eidle, which represents the braking power of the aircraft relative to a use of the thrust reversers at an idle speed of the associated engines, during rolling of the aircraft on the airport landing runway upon landing;

means (11) which are linked by a connection 12 to said means 10 and which are formed in such a way as to calculate, using said predictive braking powers Emax and Eidle, respectively:

a turnaround time ETATmax which relates to a use of the thrust reversers at maximum speed; and a turnaround time ETATidle which relates to a use of the thrust reversers at idle speed.

Thus, through the use of device 1 according to the invention, the pilot is informed before landing of the turnaround times which would be necessary to allow the brakes of the landing gear to cool down further to their heating upon landing, and this according to whether the thrust reversers are used either at maximum speed (ETATmax time) or at idle speed (ETATidle time) upon landing, i.e. as a function of the amount of auxiliary braking implemented by these thrust reversers. Decision making assistance is hence provided to the pilot, relating to the manner (either at idle or at maximum speed) in which he will be able to use the thrust reversers. In particular, the pilot is informed if said turnaround time, ETATidle, relating to the use of the thrust reversers at idle speed, is compatible with the planned journeys after landing. Such a use at idle speed presents advantages in comparison to a use of the thrust reversers at maximum speed, in particular by enabling fuel economy and hence reduction in the pollutant gas emissions, as well as reducing the noise. On the other hand, it assumes a longer turnaround time (and more presence on the landing runway).

The device 1, according to the invention, also provides decision making assistance relating to the final choice of runway exit that the pilot expects to use (from among the various possible runway exits from the landing runway). Indeed, as detailed below, the turnaround times, ETATmax and ETATidle, are calculated as a function of the runway exit selected. Consequently, by changing the selection of the runway exit, the pilot or another member of the crew, can be informed thanks to the invention of the corresponding turnaround times (i.e. the waiting times). This information allows the pilot to strategically select the appropriate runway exit, as a function of the existing operational constraints and the constraints relating to the next departure. By way of illustration, a runway exit further away from the upstream threshold of the landing runway will require the aircraft to be present for a greater length of time on the runway, but will require a reduced turnaround time (because less braking causes less heating) than it would be the case for a runaway exit closer to said upstream threshold. Knowledge of the length of time present on the runway and the turnaround times for these two runway exits (or for a higher number of runway exits) will assist the pilot in his final selection of runway exit, by considering, in particular, the operational constraints.

As detailed herein below, said means (2) determine the predicted values of the following parameters:
the landing weight of the aircraft;
a temperature difference at the airport;
the altitude of the airport;
the ground speed;
the wind speed;
a level of automatic braking; and
a rolling distance on the landing runway.

Figure 2:
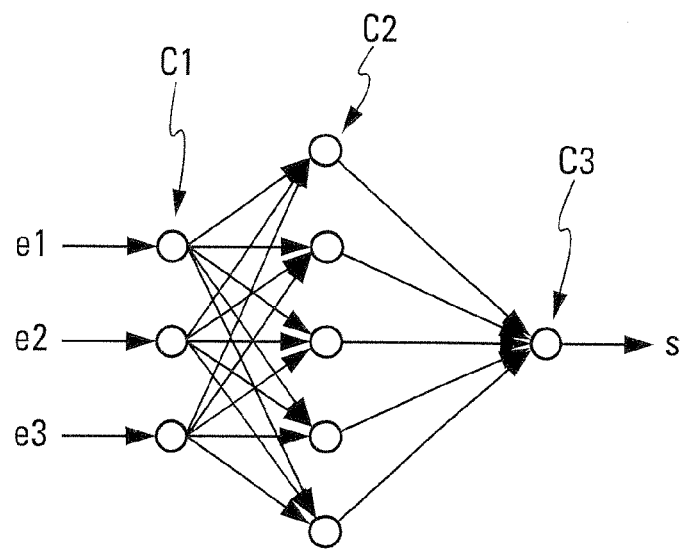
FIG. 2 is a diagram to explain the operation of a neural network used by a device according to the invention.

Furthermore, to calculate said predictive braking powers, Emax and Eidle, expressed preferably in MJ, said means 10 uses a neural network, on each occasion, such as that illustrated schematically in FIG. 2. It is known that such a network comprises an input layer C1 comprising a plurality of inputs e1, e2, e3, ... (with values xi), an intermediate layer C2 (with values si,j), and an output layer C3 which provides the output value s. The model used exhibits the following characteristics:

$$\begin{cases} xi = ei, j \\ si, 1 = \alpha i \cdot ei, 1 + \beta i \\ sj, 2 = \theta\left(\sum_{i=1}^{ne} ai, j \cdot si, 1 + bj\right) \text{ with } \theta(x) = x/(1 + |x|) \\ s = \sum_{j=1}^{n} Cj \cdot sj, 2 \\ y = (s - \beta 0)/\alpha 0 \end{cases}$$

wherein $$(\alpha i; \beta i)_{i=0,ne} \text{ such that } \begin{cases} -1 \le si, 1 \le +1 \\ -1 \le s \le +1 \end{cases}$$

Moreover, the number of coefficients, N, is equal to:

$$\begin{cases} N = \text{number } (\alpha i; \beta i) + \text{number } (ai, j; bj) + \\ \qquad \text{number } (cj) + \text{number } (\alpha 0; \beta 0) \\ N = ne \cdot 2 + n \cdot (ne + 1) + n + 2 \\ N = n \cdot (ne + 2) + 2 \cdot (ne + 1) \end{cases}$$

Said means 10 generally perform calculations for two heights, H, of the aircraft, A, namely:
for a height H greater than 500 feet; and
for a height H less than 500 feet.

Moreover, the braking power depends on the aerodynamic configuration of the aircraft, A, i.e. the position of the slats and flaps upon landing. The means 10 calculate this braking power, preferably, for a high-lift flight configuration, for which the slats and flaps are completely extended, and which is referred to as "FULL". For this purpose, said means 10 utilise a first non-linear method based on a network model to calculate the braking power Emax, and a second, non-linear method, also based on a network model, to calculate the braking power Eidle.

In these cases, the model used (for the neural network) comprises seven inputs ne=7 which relate to the following values (specified herein below):
the weight, GW;
the temperature, DISA;
the altitude, Zp;
the ground speed, GS;
the wind speed, WS;
the level of automatic braking employed, N; and
the rolling distance, Lg, on the landing runway.

Then, the network comprises 20 intermediate neurons in the layer C2 (n=20), and a number, 196, of coefficients (N=196), namely 7 $\alpha i$, 7 $\beta i$, 140 $ai,j$, 20 $bj$, 20 $cj$, 1 $\alpha 0$ and 1 $\beta 0$. The neural network then provides the corresponding braking power at the output.

Note that for a height, H, greater than 500 feet:
the weight GW is the estimated landing weight at the destination airport, this weight being calculated by a flight management system being part of means 2 and displayed on an approach-performance page;
the temperature DISA is the said temperature difference at the destination airport, which is expressed in ° C. or in K, between the OAT temperature (which is the predicted Outside Air Temperature at the destination airport, which is provided by the flight management system) and the temperature TISA (which is the ISA temperature at the pressure altitude of the airport). TISA is calculated in the usual manner;
the altitude Zp is the predicted pressure altitude, in feet, at the destination airport;
the speed, GS, is the predicted ground speed, in knots;
the wind speed, WS, is the predicted longitudinal speed;
the automatic braking level, N, depends on the zone of the landing runway where the runway exit is selected. The following parameters are, therefore, considered:
Ldry, the longitudinal stopping distance of the aircraft rolling on a dry landing runway;
Lexit, the longitudinal distance to the selected runway exit; and
Lwet, the longitudinal stopping distance of the aircraft rolling on a wet landing runway;
and it is considered that:
if Ldry<Lexit<Lwet, the level N corresponds to a first predetermined value, for example −3 m/s²;
if Lwet<Lexit, the level N takes a second predetermined value, for example −2 m/s²; and
the rolling distance Lg, in metres, on the landing runway is calculated using the following relationships:

$$\begin{cases} Lg = Xexit - Xp \\ Lg = Xexit - X0 - APD \end{cases}$$

wherein:
Xexit represents the distance along the landing runway axis up to the runway exit which has been selected;
Xp corresponds to the distance along the landing runway axis up to the predicted point where the aircraft's main landing gear touches the ground;
X0 represents the distance along the runway axis corresponding to the threshold, where it is supposed that the aircraft will be at a height of 50 feet, around 15 metres; and
ADP is the distance of the airborne phase.

Moreover, for a height, H, less than 500 feet (around 150 metres):
the weight GW represents the current weight;
the temperature DISA represents the current ISA temperature difference, expressed in ° C. or in K, from the difference between the current outside air temperature and the ISA temperature at the current standard pressure altitude;
the altitude Zp is the current pressure altitude measured;
the ground speed GS is the current measured ground speed;
the wind speed, WS, is the current longitudinal wind speed, measured as usual;
the level of automatic braking, N, depends on the zone where the selected runway exit from the landing runway is located. More precisely:

if Ldry<Lexit<Lwet, the level N corresponds to a first predetermined value, for example −3 m/s²;
if Lwet<Lexit, the level N takes a second predetermined value, for example −2 m/s²; and
the rolling distance, Lg, on the ground confirm the following relationship:

$$Lg = Xexit - Xp$$

wherein:
Xexit represents the distance along the landing runway axis up to the selected runway exit; and
Xp represents the distance along the landing runway axis up to the predicted point where the aircraft's main landing gear touches the ground.

Furthermore, said means 11 calculate said turnaround time ETATmax and said turnaround time ETATidle, preferably expressed in minutes, using the following expressions:

$$\begin{cases} ETAT\max = T0 + K \cdot E\max \\ ETATidle = T0 + K \cdot Eidle \end{cases}$$

in which:
T0 is a predetermined reference time, for example 18 minutes; and
K is a predetermined parameter, for example 3.7 where Emax and Eidle are expressed in MJ.

Moreover, said turnaround times ETATmax and ETATidle need to be greater than a minimum predetermined time, for example 60 minutes, and they may be rounded up to the next five minutes.

Furthermore, said device 1 also includes means, for example said means 11, to compare said predictive braking powers, Emax and Eidle, to a minimum power, E0, requiring a deflation of the tyres, for example 70 MJ, and said display means 5 presenting said indication means 8 and 9 on said visualisation screen 7, as a function of said comparisons.

Figure 3A:
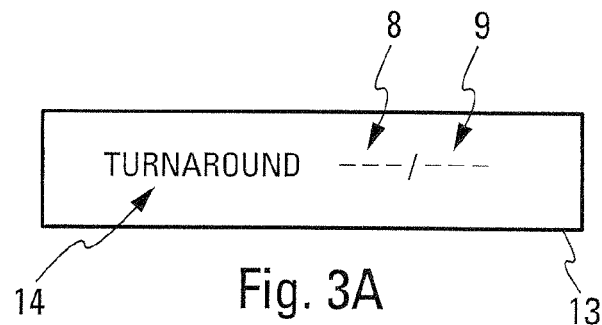
FIGS. 3A, 3B and 3C represent displays likely to be produced by a device in accordance with the invention.
Figure 3B:
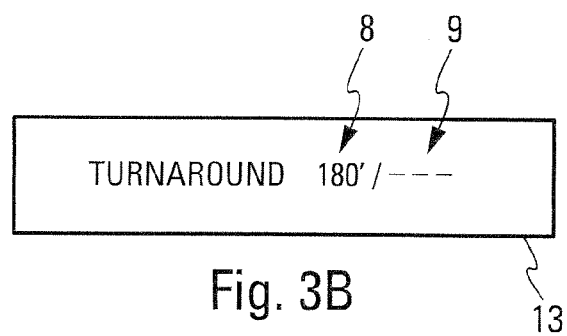
Figure 3C:
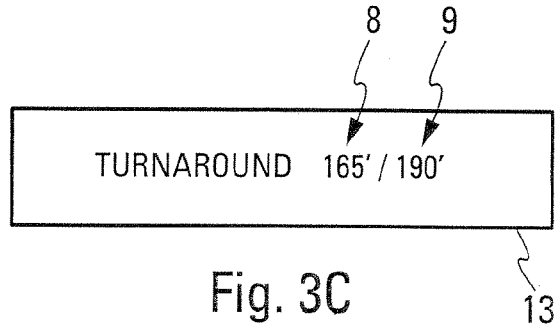

Moreover, in a preferred embodiment of the invention:
if Eidle>E0 and Emax>E0, the display means 5 display on said visualisation screen 7 inside a rectangle 13 the indication means 8 and 9 indicating that the data are not valid for said turnaround times ETATmax and ETATidle. In the example shown in FIG. 3A, the indication means 8 and 9 correspond to dashes;
If Eidle<E0<Emax, the display means 5 display, in the rectangle 13 on the visualisation screen 7, a numerical value 8 indicating said turnaround time ETATidle (namely 180', i.e. 180 minutes) and indication means 9 (namely the dashes) indicating that the data are not valid for said turnaround time ETATmax, as shown in FIG. 3B; and
if Emax<E0 and Eidle<E0, the display means (5) display two numerical values 8 and 9 in the rectangle 13 of the visualisation screen 7, indicating said values of the turnaround times ETATmax (namely 190' in this example) and ETATidle (165'), respectively, as represented in FIG. 3C.

The rectangle 13 also comprises a message 14 ("Turnaround") indicating that the displayed times represent the turnaround times.

Furthermore, said display means 5 could be part of an airport navigation system of the "On-board Airport Navigation System" or OANS type. In this case, the visualisation screen 7 can be a standard navigation screen, which notably contains a display mode known as "plan". In the usual way, this "plan" view corresponds to a view from above the airport, orientated towards the north and the aircraft moves on this map, which is fixed.

In a preferred embodiment of the invention, said device 1 also comprises means (non shown) enabling the automatic deactivation thereof when a braking mode, in particular an automatic braking mode of the "Brake-To-Vacate" type, BTV, is armed in the usual manner by a pilot. This makes it possible, in particular, to avoid overloading the display with information which is not required to carry out the landing.

Moreover, said device 1 is activated, preferably, as soon as the pilot selects a runway exit on an appropriate device in the usual way, for example, a device of the "Control and Display System" type, CDS, in order to provide him with the aforementioned information to assist him in preparing the landing.

The invention claimed is:

1. A method for assisting piloting of an aircraft during the landing phase at an airport, said aircraft having engines which are equipped with thrust reversers able to be used for braking the aircraft, said thrust reversers being able to be used at a maximum speed or at an idle speed, comprising, during the approach to the airport:
   a) determining, via a processor, the predicted values of parameters relating to the aircraft and the airport;
   b) calculating, by a processor, through said predicted values, at least the following;
      a first predictive braking power Emax, which represents the braking power of the aircraft relative to a first use of the thrust reversers at maximum speed, during rolling of the aircraft on the airport landing runway upon landing; and a second predictive braking power Eidle, which represents the braking power of the aircraft relative to a second use of the thrust reversers at idle speed, during rolling of the aircraft on the landing runway upon landing;
   c) calculating through said first and said second predictive braking powers, the following, via a processor, respectively: a first turnaround time which is related to said first use of the thrust reversers at maximum speed; and a second turnaround time which is related to said second use of the thrust reversers at idle speed, a turnaround time representing a predictive waiting period for the aircraft before undertaking a next flight in order to allow the wheels of said aircraft to cool down further to the heating generated by braking upon landing; and
   d) presenting, via a processor, indication means (8,9), indicating said first and second turnaround times, on at least one visualization screen (7).

2. Method according to claim 1, wherein at step a), the predicted values of the following parameters are determined, via a processor:
   the landing weight of the aircraft;
   a temperature difference at the airport;
   the altitude of the airport;
   the ground speed;
   the wind speed;
   a level of automatic braking; and
   a rolling distance on the landing runway.

3. Method according to claim 1, wherein at step b), each of said first and said second predictive braking powers, Emax and Eidle, are determined, via a processor, using a neural network.

4. Method according to claim 1, wherein at step c), said first turnaround time ETATmax and said second turnaround time ETATidle are calculated, via a processor, using the following expressions:

$$\begin{cases} ETAT\max = T0 + K \cdot E\max \\ ETAT idle = T0 + K \cdot Eidle \end{cases}$$

in which:
   T0 is a predetermined reference time;
   K is a predetermined parameter;
   Emax is said first predictive braking power; and
   Eidle is said second predictive braking power.

5. Method according to claim 1, wherein said first and second predictive braking powers, Emax and Eidle, are compared, via a processor, to a minimum power, E0, requiring a deflation of the tyres, and in that, at step d), said indication means (8, 9) are displayed on said visualization screen (7), as a function of said comparisons.

6. Method according to claim 5, wherein:
   if Emax<E0 and Eidle<E0, two numerical values are displayed on said visualisation screen (7), as indication means (8, 9), indicating respectively said first and second turnaround times, ETATmax and ETATidle;
   if Eidle>E0 and Emax>E0, elements are displayed on said visualisation screen (7), as indication means (8, 9), indicating that the data are not valid for said turnaround times ETATmax and ETATidle; and
   if Eidle<E0<Emax, a numeric value is displayed on said visualisation screen (7), as indication means (8, 9), indicating said turnaround time ETATidle and an element indicating that the data are not valid for said turnaround time ETATmax.

7. Method according to claim 1, it further comprising deactivating, via a processor, said method when a braking mode is armed on the aircraft.

8. A device for assisting piloting of an aircraft during the landing phase at an airport, said aircraft having engines which are equipped with thrust reversers able to be used for braking the aircraft, said thrust reversers being able to be used at a maximum speed or at an idle speed, comprising: means (2) for determining, the predicted values of parameters relating to the aircraft and the airport;
   means (10) for calculating, with said predicted values:
      a first predictive braking power, which represents the braking power of the aircraft relative to a first use of the thrust reversers, during rolling of the aircraft on the airport landing runway upon landing;
      and a second predictive braking power, which represents the braking power of the aircraft, relative to a second use of the thrust reversers, during rolling of the aircraft on the landing runway upon landing; means (11) for calculating with said first and second predictive braking powers respectively:
      a first turnaround time which is related to said first use of the thrust reversers; and
      a second turnaround time which is related to said second use of the thrust reversers,
   a turnaround time representing a predictive waiting period for the aircraft before undertaking a next flight in order to allow the wheels of said aircraft to cool down further to the heating generated by braking upon landing;
   and displaying means (5) for presenting, on at least one visualization screen (7), indication means (8, 9) indicating said first and second turnaround times.

9. An aircraft, comprising a piloting assistance device (1) such as specified in claim 8.

10. A method for assisting piloting of an aircraft during the landing phase at an airport, said aircraft having engines which are equipped with thrust reversers able to be used for braking the aircraft, said thrust reversers being able to be used at a maximum speed or at an idle speed, comprising, during the approach to the airport:
- a) determining, via a processor, the predicted values of parameters relating to the aircraft and the airport;
- b) calculating, by a processor, through said predicted values, at least the following;
   a first predictive braking power Emax, which represents the braking power of the aircraft relative to a first use of the thrust reversers at maximum speed, during rolling of the aircraft on the airport landing runway upon landing; and a second predictive braking power Eidle, which represents the braking power of the aircraft relative to a second use of the thrust reversers at idle speed, during rolling of the aircraft on the landing runway upon landing;
- c) calculating, via a processor, through said first and said second predictive braking powers, the following, respectively: a first turnaround time ETATmax which is related to said first use of the thrust reversers at maximum speed; and a second turnaround time ETATidle which is related to said second use of the thrust reversers at idle speed, a turnaround time representing a predictive waiting period for the aircraft before undertaking a next flight in order to allow the wheels of said aircraft to cool down further to the heating generated by braking upon landing, wherein said first turnaround time ETATmax and said second turnaround time ETATidle are calculated using the following expressions:

$$\begin{cases} ETATmax = T0 + K * Emax \\ ETATidle = T0 + K * Eidle \end{cases}$$

in which:
T0 is a predetermined reference time,
K is a predetermined parameter,
Emax is said first predictive braking power, and
Eidle is said second predictive braking power; and
- d) presenting indication means (8,9), indicating said first and second turnaround times, on at least one visualization screen (7).

11. A method for assisting piloting of an aircraft during the landing phase at an airport, said aircraft having engines which are equipped with thrust reversers able to be used for braking the aircraft, said thrust reversers being able to be used at a maximum speed or at an idle speed, comprising, during the approach to the airport:
- a) determining, via a processor, the predicted values of parameters relating to the aircraft and the airport;
- b) calculating, through said predicted values, at least the following, by a processor;
   a first predictive braking power Emax, which represents the braking power of the aircraft relative to a first use of the thrust reversers at maximum speed, during rolling of the aircraft on the airport landing runway upon landing; and a second predictive braking power Eidle, which represents the braking power of the aircraft relative to a second use of the thrust reversers at idle speed, during rolling of the aircraft on the landing runway upon landing;
- c) calculating through said first and said second predictive braking powers, the following, via a processor, respectively: a first turnaround time which is related to said first use of the thrust reversers at maximum speed; and a second turnaround time which is related to said second use of the thrust reversers at idle speed, a turnaround time representing a predictive waiting period for the aircraft before undertaking a next flight in order to allow the wheels of said aircraft to cool down further to the heating generated by braking upon landing;
- d) comparing, via a processor, said first and second predictive braking powers, Emax and Eidle, to a minimum power, E0, requiring a deflation of the tires; and
- e) presenting indicating means (8,9), indicating said first and second turnaround times, on at least one visualization screen (7), wherein:
   if Emax<E0 and Eidle<E0, two numerical values are displayed on said visualization screen (7), as indication means (8, 9), indicating respectively said first and second turnaround times, ETATmax and ETATidle;
   if Emax>E0 and Emax>E0, elements are displayed on said visualization screen (7), as indication means (8, 9), indicating that the data are not valid for said turnaround times ETATmax and ETATidle; and
   if Eidle<E0<Emax, a numeric value is displayed on said visualization screen (7), as indication means (8, 9), indicating said turnaround time ETATidle and an element indicating that the data are not valid for said turnaround time ETATmax.

\* \* \* \* \*